INVENTOR
Paul E. Frantz
BY
ATTORNEY

April 21, 1936.　　　　P. E. FRANTZ　　　　2,038,076
CONTROL MEANS FOR MOTOR OPERATED APPARATUS
Filed June 27, 1932　　2 Sheets-Sheet 2

INVENTOR
Paul E. Frantz
BY
ATTORNEY

Patented Apr. 21, 1936

2,038,076

UNITED STATES PATENT OFFICE 2,038,076

CONTROL MEANS FOR MOTOR OPERATED APPARATUS

Paul E. Frantz, Euclid, Ohio, assignor to The Apex Electrical Manufacturing Company, Cleveland, Ohio, a corporation of Ohio Application June 27, 1932, Serial No. 619,505

12 Claims. (Cl. 74—472)

This invention relates to control devices for motor driven apparatus, and in particular, control devices for electrically operated laundry machines.

In the use of small motor operated appliances, such as laundry machines, it is customary to employ an electrical motor of the induction type by reason of the lower cost of induction motors, as compared with motors of other types. The use of an induction motor for such purposes is objectionable in that, it requires a very high starting current, and if the load is too great in starting, the winding of the motor may heat up and burn the insulation off of the starting winding. Centrifugal clutches have been employed to prevent the occurrence of such accidents to induction motors, and while they accomplish the desired object, they add considerably to the cost of the appliance.

The present invention is directed to devices employing an electric motor as a source of power and it has for its objects the provision of control means, necessitating the starting of the motor before the load of the machine can be imposed upon the motor; the provision of means tending to insure the motor attaining its rated speed before the load is imposed upon it, and the provision of means for holding such a device in its various adjusted positions.

The present invention is particularly applicable to laundry machines of the type disclosed in the copending applications of Walter A. Frantz and John J. McCabe, Serial Numbers 614,000—614,601 filed May 27, 1932.

With these and other objects and advantages in view, the invention consists in the novel construction, arrangement and combination of parts hereinafter described and illustrated in some of its embodiments in the accompanying drawings and particularly pointed out in the appended claims.

Figure 1:
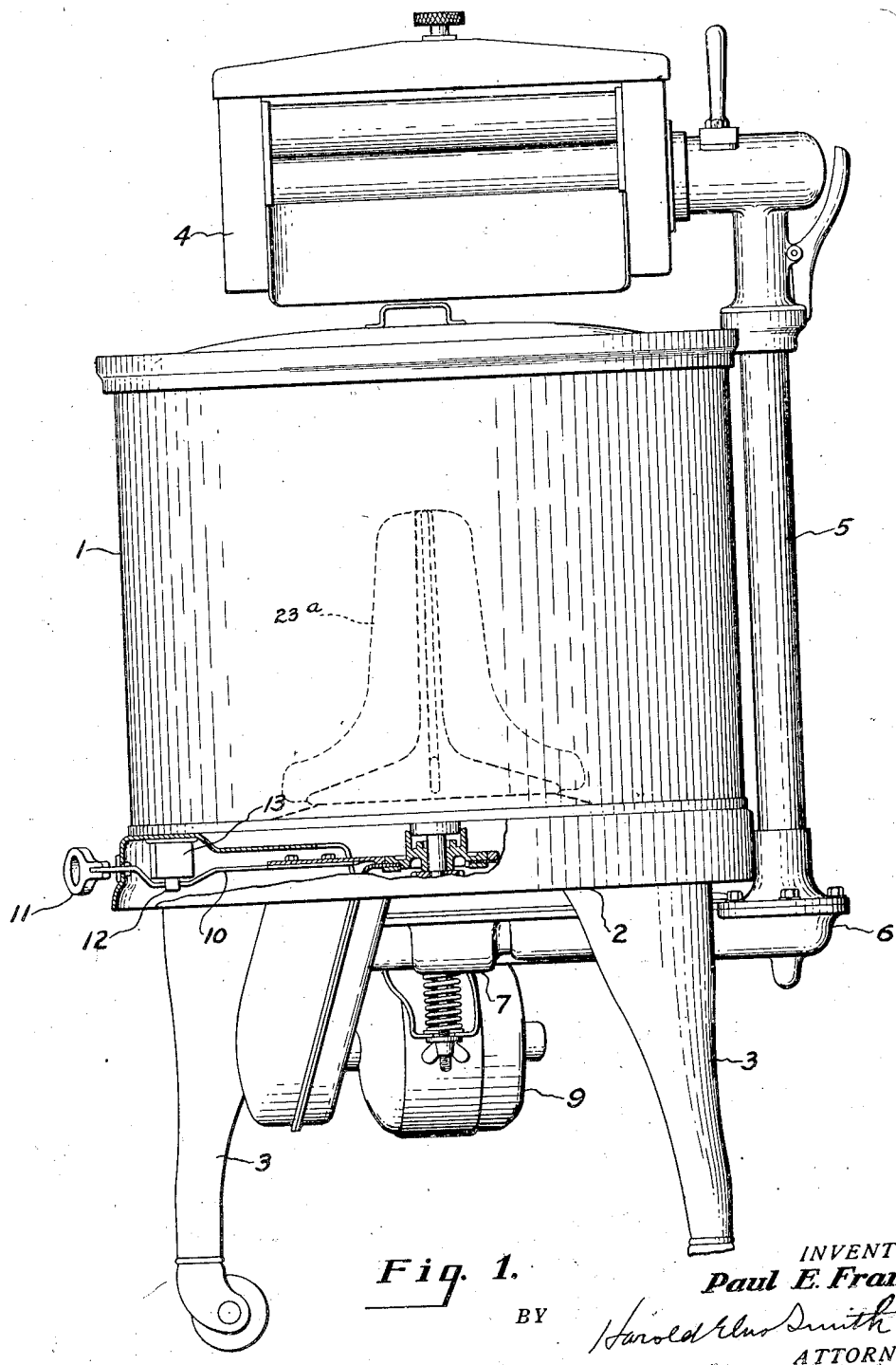
Figure 1 is a side elevational view of a laundry machine employing my improved control.

The machine shown in Figure 1 is used for the purpose of illustrating one mode of practicing my invention, and it comprises a tub or container 1, for the reception of a detergent liquid and articles to be washed. The tub is supported on a base 2, which is in turn carried upon the supporting legs 3. A wringer 4, is carried above the top of the tub for the purpose of extracting liquid from the clothes after the washing operation has been performed. The wringer 4 is supported on a column 5, which is carried by a gear case 6. A second gear case 7, within which is housed suitable mechanism for driving both the washing and wringing devices is supported beneath the tub 1. A driving shaft 8 connects the mechanism within the two gear cases to each other.

The mechanism within the gear case 7, is driven by an electric motor 9, which is supported beneath the container 1. The operation of the motor 9, is controlled by means of a control lever 10, which has an operating handle 11, located exteriorly of the machine where it is readily accessible for use. The lever 10 is connected to the operating mechanism within the gear case 7, and it is further arranged to engage the operating element 12, of a motor control switch 13.

The control lever 10 is connected to a quadrant 14, which is rotatably mounted at 15 on the gear case 7. The center of rotation of the quadrant 14 coincides with the axis of the tub 1. The gear teeth of the quadrant 14 engage the teeth of a gear segment 16, which is fixedly secured to an elongated pinion 17. The teeth of the pinion 17 mesh with the rack teeth 18, which are provided in the bearing and guide member 19.

The member 19 is slidably carried at one end in a channel or guideway 20. At its opposite end the member 19 is provided with an arcuate guideway for slidably receiving the curved rack bar 21, the teeth of which engage in driving relation with the pinion 22. The pinion 22 is keyed to a shaft 23, which is operatively connected to an agitator 23a, that is rotatably supported thereon for oscillation about a vertical axis within the tub 1.

The rack bar 21 is operatively connected to one end of a connecting rod 24. The opposite end of the connecting rod is journaled on an eccentric 25, which is secured to and driven by a worm gear 26. The worm gear 26 is driven by a worm 27, which is in turn connected in operated relation to the motor 9.

Figure 2:
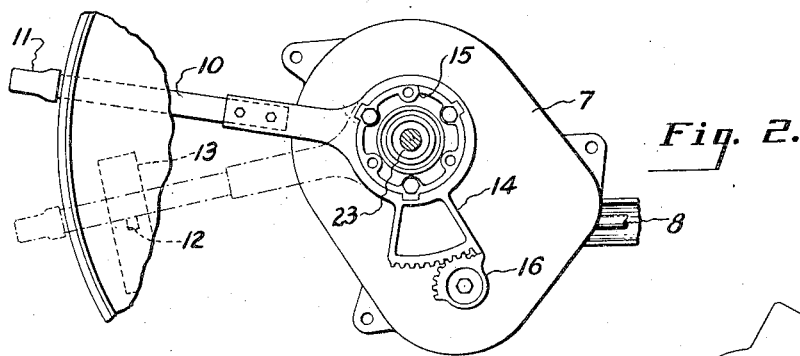
Figure 2 is a plan view of my improved control device.
Figure 5:
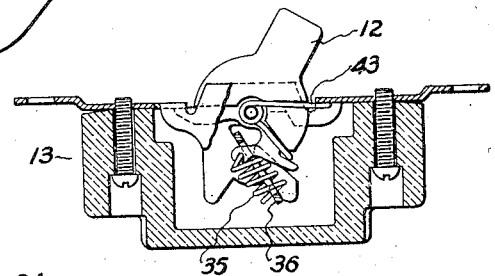
Figure 5 is an enlarged side elevational view, partly in section, showing one side of the motor control switch.
Figure 3:
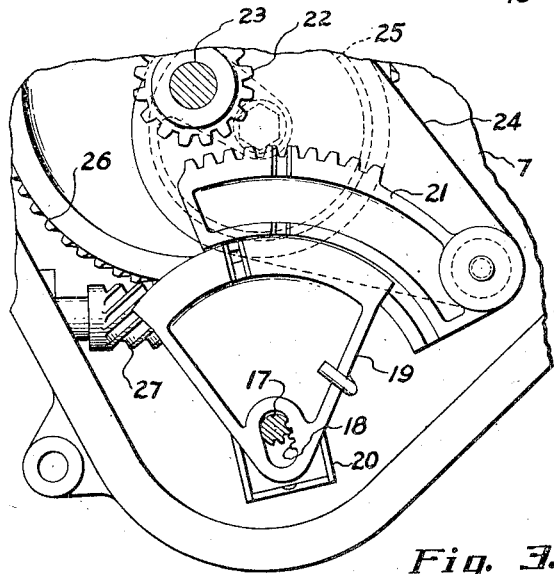
Figure 3 is an enlarged fragmentary view of the gearing employed to drive the washing machine shown in Figure 1.
Figure 6:
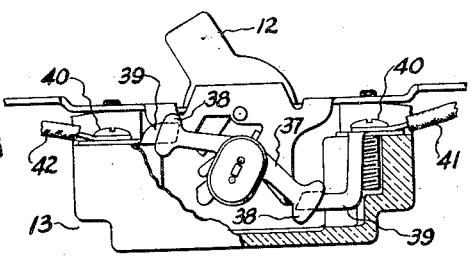
Figure 6 is an enlarged elevational view, partly in section, of the opposite side of the motor control switch.
Figure 4:
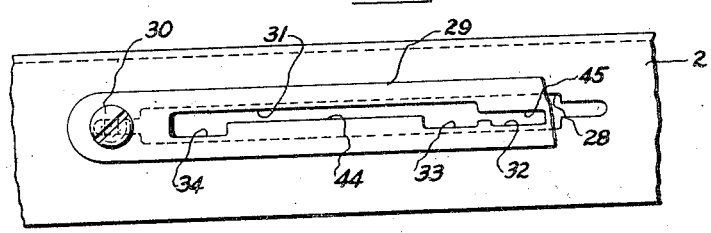
Figure 4 is an enlarged side elevational view of the control lever guide way.

In Figure 2, the full line position of the control device illustrates the position it occupies when the motor is running and the washing machine agitator is being driven. The dotted line position of the control means in Figure 2, illustrates the position of the control when the washing machine agitator is disconnected from its driving mechanism, and when the motor operating switch is open and the motor is disconnected from its source of electrical current supply. When the control means is in the position as shown by dotted lines in Figure 2, the rack bar 21 and its guideway 19 occupy the position illustrated in Figure 3.

The control lever 10, extends through a slot 28, provided in the base 2 of the machine. A plate 29 is adjustably fitted over the slot 28, and is held in its adjusted positions by means of screws 30. The plate 29 is provided with a slot 31, in which is received the lever 10. The bottom part of the slot 29 is provided with three notches 32, 33, and 34. The lever 10 is formed from a resilient strip of metal and is under a slight tension so that it will tend to spring into the notches provided in the plate 29, when it is shifted from one position to the other.

The notch 32 corresponds to the "off" position, in which the motor switch 13 is open, and the agitator is disconnected from its driving mechanism. The notch 33 corresponds to an intermediate, or motor running position in which the switch 13 is closed and the motor is running; the agitator, for such a position of the control, is not connected in driven relation to the mechanism. The notch 34 indicates the "on" position of the machine, and when the lever 10 is in this notch, the motor is running and the agitator is connected in driven relation with the gear mechanism.

The switch 13 is in the form of a conventional snap switch, in which an operating member 12 is provided to throw an overcenter spring 35. When the spring 35 is shifted it moves a member 36 with a snap movement to either one or the other of its two extreme positions. The member 36 carries a conductor bar 37, the ends of which are provided with contact members 38. The contact members 38 and the bar 37 connect and disconnect the contacts 39 with each other. The contacts 39 are provided with screws 40, for the connection of one of the motor leads 41 and the current supply line 42.

The present switch is slightly different from the conventional snap switch in that it is provided with a torsion spring 43. The spring 43 operates to move the switch to its "on" or "closed" position. By reason of this arrangement, when the operating lever 10 is moved out of contact with control member 12, the switch is snapped to its "on" position by the spring 43, and the motor lead 41 is connected to the current supply line 42. When the lever 10 is moved in the reverse direction, the member 12 is moved in opposition to the force of the spring 43, and the switch is snapped to its "off" or "open" position.

The control herein disclosed necessitates the starting of the electric motor before any load can be imposed upon the motor, and eliminates the necessity of a clutch or other device to prevent overloading of the motor before it has attained its rated running speed. My improved motor control also tends to prevent the imposing of a load upon the motor before it comes up to its rated speed. This result is accomplished by forming the lower level of the part 44 of the slot or guideway 31 for the control lever, at about the same level as the level of the portion 45 of the guideway so that it is necessary to give the handle 11 an additional lift in moving it from the motor operating position to the washer driving or "on" position.

The present invention is shown in connection with a laundry machine, and while it is particularly adapted for use in controlling such appliances, it is obvious that the same arrangement could be employed to control other mechanisms, which employ an electric motor as a source of power, where such mechanisms use a clutch device for connecting and disconnecting the motor in driving relation with the load of the machine.

With these and further objects in view it is to be understood that the particular forms of apparatus shown and described and the particular procedure set forth are presented for purposes of explanation and that various modifications of said apparatus and procedure can be made without departing from my invention as described in the appended claims.

Having thus described my invention what I claim is:

1. In a power operated machine, a driven device, power driving means therefor comprising an electric motor and a controllable driving connection therefor with said device, and control means for first starting said motor and then operating said driving connection for connecting said motor to said driven device, said means including an operating member and means associated therewith for engaging and stopping the operating member immediately after it has been operated to start the motor to permit acceleration of said motor prior to its connection to said driven device.

2. In a power operated machine, a driven device, power driving means therefor comprising an electric motor and a controllable driving connection therefor with said device, and control means for said motor and driving connection including an operating member and means associated therewith for engaging and positively stopping the operating member prior to its actuation in effecting driving connection between the motor and said device and subsequently to its actuation in effecting the starting of the motor.

3. In an electrically operated machine, a driven device, an electric motor, a control switch therefor, mechanism operatively connected to and driven by said motor, a disconnectible driving connection between said mechanism and said device for selectively driving the latter, a single means to first control the actuation of said switch to start said motor and then to actuate said driving connection to connect said mechanism to said device, said means being adapted to effect the stated operations only in the order named, and positive stop means associated with said single means to retard the movement thereof subsequently to the actuation of said switch.

4. In an electrically operated machine, a driven device, an electric motor, a control switch therefor, mechanism operatively connected to and driven by said motor, a disconnectible driving connection between said mechanism and said device for selectively driving the latter, means comprising a control member and associated instrumentalities to first control the actuation of said switch to start said motor and then to actuate said driving connection to connect said mechanism to said device, said means being adapted to effect the stated operations only in the order named, and positive stop means associated with said control member to retard the actuation of the control member just prior to the actuation of said driving connection.

5. In an electrically operated machine, a driven device, an electric motor, a control switch therefor, mechanism operatively connected to and driven by said motor, a disconnectible driving connection between said mechanism and said device for selectively driving the latter, a control member for said switch and driving connection adapted to first control the operation of said switch in starting said motor and then to actuate said driving connection in connecting said mechanism to said device, and positive stop means associated with said control member adapted to insure the elapse of a determinable time interval between the aforesaid operations thereof.

6. In an electrically operated machine, a driven device, an electric motor, a control switch therefor, mechanism operatively connected to and driven by said motor, a disconnectible driving connection between said mechanism and said device for selectively driving the latter, a control member for said switch and driving connection adapted to first control the operation of said switch in starting said motor and then to actuate said driving connection in connecting said mechanism to said device, and means engaging said control member for stopping the same between the aforesaid operations thereof.

7. In an electrically operated machine, a driven device, an electric motor, a control switch therefor, mechanism operatively connected to and driven by said motor, a disconnectible driving connection between said mechanism and said device for selectively driving the latter, a control member for said switch and driving connection adapted to first control the operation of said switch in starting said motor and then to actuate said driving connection in connecting said mechanism to said device, and a notched plate for stopping said control member between the aforesaid operations thereof.

8. In an electrically operated machine, a driven device, an electric motor, a control switch therefor, mechanism operatively connected to and driven by said motor, a disconnectible driving connection between said mechanism and said device for selectively driving the latter, a control member for said switch and driving connection adapted to first control the operation of said switch in starting said motor and then to actuate said driving connection in connecting said mechanism to said device, and a detent in the path of said control member for temporarily stopping said control member between the aforesaid operations thereof.

9. In an electrically operated machine, a driven device, an electric motor, a control switch therefor, mechanism operatively connected to and driven by said motor, a disconnectible driving connection between said mechanism and said device for selectively driving the latter, a control member for said switch and driving connection adapted to first control the operation of said switch in starting said motor and then to actuate said driving connection in connecting said mechanism to said device, means engaging said control member for stopping the same between the aforesaid operations thereof, and means for securing said last named means in various positions of adjustment.

10. In a power operated machine, a driven device, power driving means therefor comprising an electric motor and a controllable driving connection therefor with said device, a supporting device for the aforesaid structure having a circular peripheral portion, and control means for first starting said motor and then operating said driving connection for connecting said motor to said driven device, said control means including an operating member pivoted for movement in a path concentric with the peripheral portion of said supporting device and means associated therewith carried by said supporting device for stopping the operating member after it has been operated to start said motor to permit acceleration of the motor prior to its connection to the driven device.

11. In an electrically operated machine, a driven device, an electric motor, a control switch therefor, spring means for biasing said switch to its closed position, mechanism operatively connected to and driven by said motor, a disconnectible driving connection between said mechanism and said device for selectively driving the latter, a single means to first control the operation of said switch to start said motor and then to actuate said driving connection to connect said mechanism to said device, said means being adapted to effect the stated operations only in the order named, and stop means associated with said single means to retard the movement thereof subsequently to the actuation of said switch.

12. In a power operated machine, a driven device, power driving means therefor comprising an electric motor and a controllable driving connection therefor with said device, a supporting device for the aforesaid structure having a circular peripheral portion, and control means for first starting said motor and then operating said driving connection for connecting said motor to said driven device, said control means including an operating member and a snap-switch having a spring for biasing the switch to one of its limiting positions and means associated with said member for stopping the same after controlling the operation of said switch and with it said motor to permit acceleration of the motor prior to its connection to the driven device.

PAUL E. FRANTZ.